UNITED STATES PATENT OFFICE.

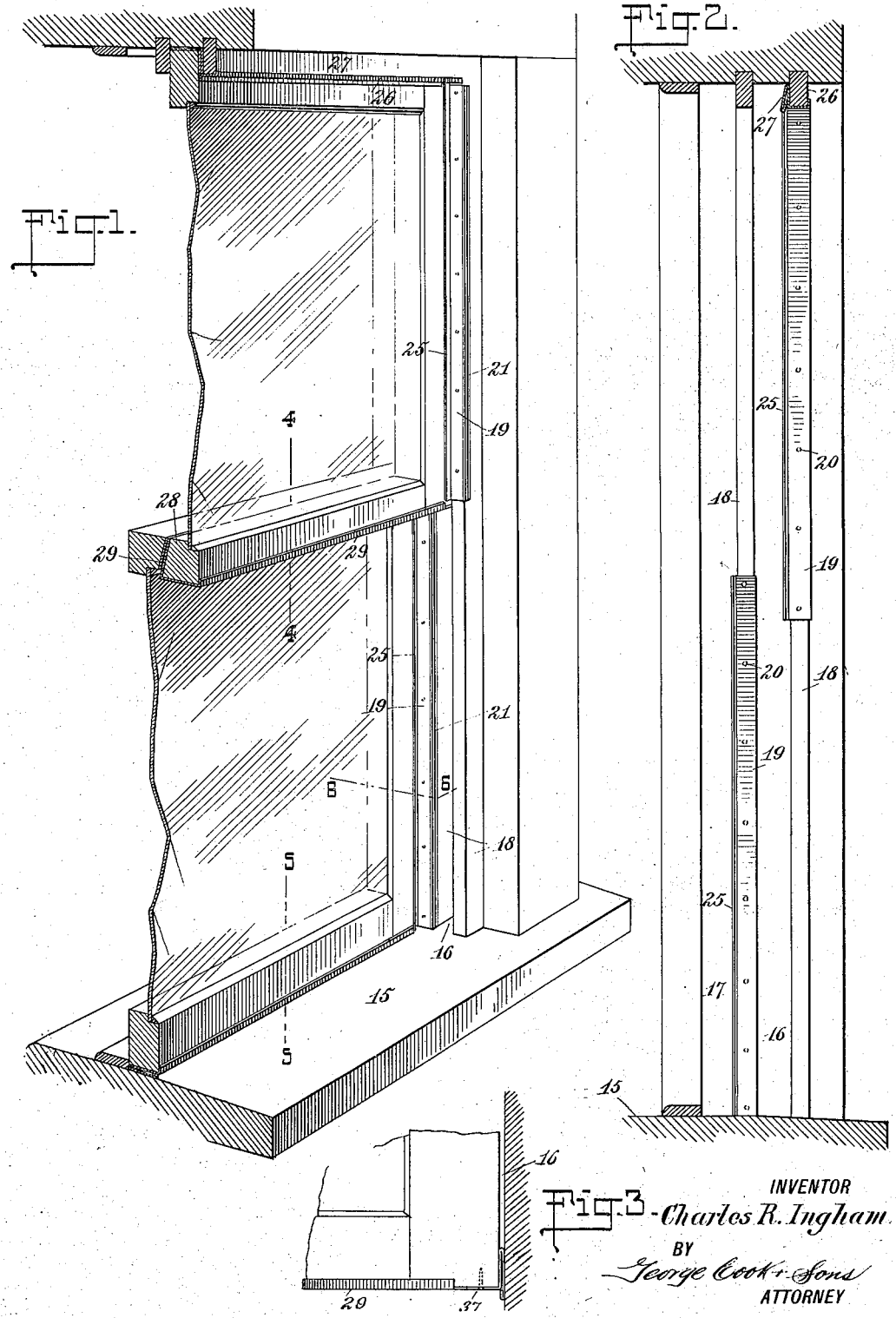

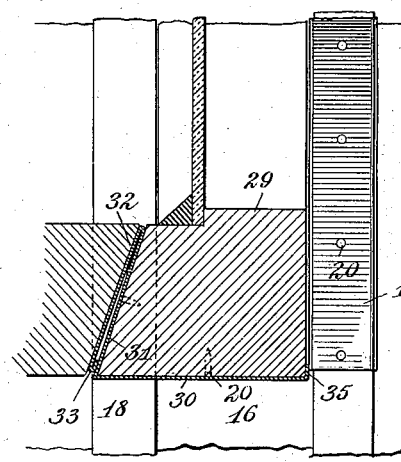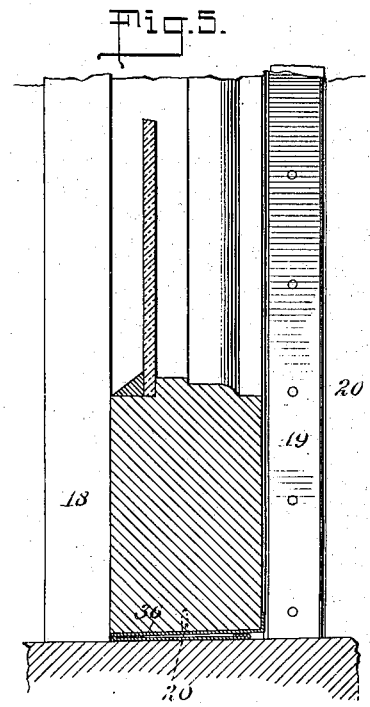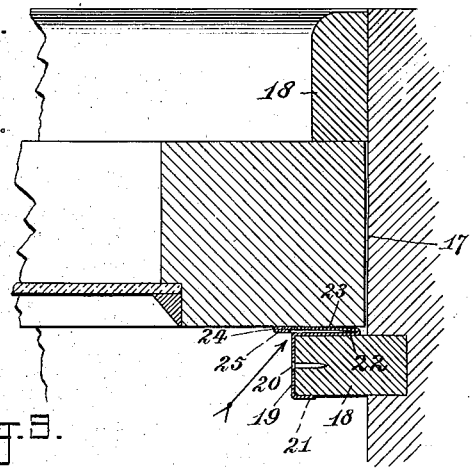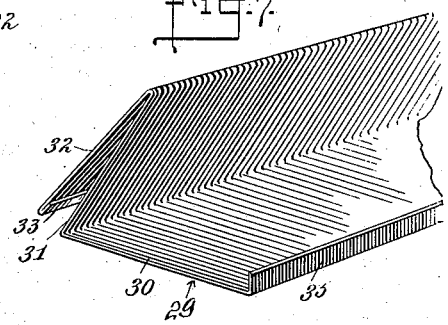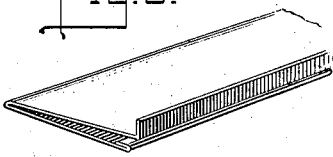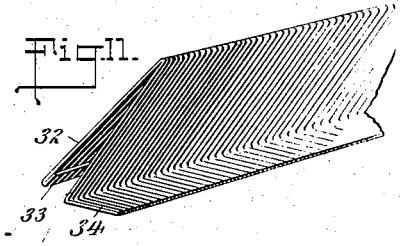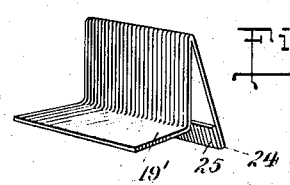

CHARLES R. INGHAM, OF HOHOKUS TOWNSHIP, BERGEN COUNTY, NEW JERSEY.

WEATHER-STRIP.

1,166,413.  Specification of Letters Patent.  Patented Dec. 28, 1915.

Application filed June 30, 1915. Serial No. 37,159.

*To all whom it may concern:*

Be it known that I, CHARLES R. INGHAM, a citizen of the United States, and a resident of Hohokus township, in the county of Bergen and State of New Jersey, have made and invented certain new and useful Improvements in Weather-Strips, of which the following is a specification.

This invention relates to weather strips for windows and has in view the provision of a weather strip, which may be applied to a window without requiring that the window sashes be removed or in any way affecting the construction of either the window frame or the sashes, thus allowing the strip to be easily and quickly applied to a window with little or no labor and requiring only ordinary skill.

A further object is to provide a weather strip, which is particularly adapted for windows which are exposed to high winds, the construction being such that it is practically impossible for the air to pass between the weather strip and adjacent portions of the window, regardless of the wind velocity.

A further object is to provide a weather strip which is formed from a single piece of sheet metal, thus rendering it subject to economic manufacture, and with the resulting construction such that the window sashes are securely held against rattling and a resilient runway is provided therefor, ordinarily holding the window sashes against movement, and allowing them to be easily and smoothly raised and lowered.

A further object is to provide a weather strip securable to the guide rail of the window casing and so constructed that the action of the wind upon the weather strip aids the same in its exclusion of the air, and the higher the wind velocity, the more positive and more effective will be the action of the weather strip.

Other objects and advantages will appear as the description proceeds, wherein it is to be understood that changes in the precise embodiment of the invention can be made within the scope of what is claimed, without departing from the spirit thereof.

The preferred embodiment of my invention is disclosed in the accompanying drawings, wherein:—

Figure 1 is a fragmental view in perspective of a window equipped with weather strips embodying the characteristic features of my invention. Fig. 2 is a view in vertical section of a window so equipped. Fig. 3 is a fragmental view and partially in section, of the lower corner of the upper window sash, the latter being represented in elevation. Fig. 4 is a view in vertical section, taken on the line 4—4 of Fig. 1. Fig. 5 is a view in vertical section, taken on the line 5—5 of Fig. 1. Fig. 6 is a view in horizontal section, taken on the line 6—6 of Fig. 1. Fig. 7 is a view in perspective of the weather strip which is utilized between the parting rails of the window sashes, as illustrated in Fig. 4. Fig. 8 is a view in perspective of the weather strip which is secured to the lower surface of the bottom sash and which also acts as a resilient cushion therefor. Fig. 9 is a view in perspective of the weather strip, as employed upon the guide rails of the window frame or casing. Fig. 10 is a perspective view of a somewhat slightly modified form of weather strip. Fig. 11 is a view in perspective of a slightly modified form of weather strip of the type illustrated in Figs. 4 and 7.

Referring particularly to the several views, the window frame or casing 15 is provided with the usual sash runways 16, 17, formed by the guide rails or parting strips 18.

The weather strip is secured to the window frame and is applied to the guide rails 18 thereof, either during the construction of the window, or at any time subsequent thereto. The weather strip includes the attaching flange 19, which extends across the outer and exposed surface of the parting strip or guide rail 18, and is secured thereto by the brads 20, which are driven through the attaching flange directly into the guide rail. The one edge of the attaching flange 19 is bent around the guide rail, as at 21, so as to protect the same, although this protecting edge is not essential and may be omitted, as disclosed in Figs. 10 and 11, this somewhat modified form resulting, in some instances, in a substantial saving in raw material. The remote edge of the attaching flange is bent at substantial right angles, to form the guide rail plate 22, it being so termed by reason of its contact with the guide rail 18. The guide rail plate 22 projects to a point near the bottom of the sash runway 16 or 17, as the case may be, according to whether the strip is secured to the guide rail for the upper or lower sash. The lower extremity of the guide rail plate is bent upon itself to form the sash plate 23, the two plates constituting a V-shaped resilient member, the connected portions of which, lie wholly between the adjacent sides of the guide rail and the window sash. The sash plate is relatively wider than the guide rail plate and projects to, and beyond, the plane of the attaching flange 19, and has its outer and exposed edge 24 bent over and upon itself, as at 25, with the rib, as thus formed, stopping short of the plane of the attaching flange 19 so that it does not interfere with the contacting of the guide rail and sash plates, as depicted in Fig. 3.

The bending or doubling of the exposed portion 24 of the sash plate forms a selvaged or finished edge, which, owing to its rounded and smooth contour, will not injure the hands, even though the same be brought in to forcible contact therewith, such as may happen during the opening or closing of the window sashes. One of the particular features of the present invention resides in the protrusion of the unattached or free portion 23 of the weather strip, for it is by reason of this protrusion that the particular advantage is had, that as the air strikes against the weather strip, as indicated by the arrow in Fig. 6, the same is forced against the sash, with the result that the greater the wind pressure against the weather strip the tighter it will become, rendering the weather strip particularly effective in exposed places, where strong and high winds are prevalent.

The weather strip, as thus outlined, may be easily and quickly applied to a window without requiring that any of the parts be disturbed. The attaching flange is placed against the outer surface of the guide rail, and secured thereto either by brads or analogous means, and at the same time the V-shaped resilient member, which is carried by the attaching flange and composed of the guide rail plate and sash plate, is inserted between the guide rail and adjacent portion of the window sash. The entire device may accordingly be bent from a single strip of metal, possessing the desired resiliency and in addition to the action of the weather strip with regard to preventing the passage of air between the window sashes, the weather strip holds the sashes against rattling and provides for the smooth and easy raising and lowering of the window.

The slightly modified form of weather strip, illustrated in Fig. 10, is similar to the foregoing with the exception that the attaching flange 19' does not include a turned edge, similar to 21, but projects, for a short distance only, across the parting bead, thus resulting in a substantial saving in the amount of raw material required for the construction of the strip.

In addition to the weather strips, which are provided upon the sides of the window, I also employ the weather strip 27 at the top of the window frame, which is secured to the bead 26 and is similar in construction to the weather strip already outlined. The parting rail 28 of the upper sash is provided with the weather strip 29, which is illustrated in detail in Fig. 7 and in a modified form in Fig. 11, in which figures it will be observed to include an attaching flange 30 with the connected and outstanding plates 31—32, the latter plate being provided with the selvaged edge 33, which is adapted to be contained between the meeting rails of the upper and lower sashes and prevent the passage of air therebetween. The modified form, illustrated in Fig. 11, has the straight attaching flange 34, whereas the attaching flange, illustrated in Fig. 7, includes the turned outer edge 35, such changes, however, coming clearly within the scope of my invention. The bottom of the bottom sash, as illustrated in Fig. 5, is also provided with the weather strip 36, the same being of a somewhat modified form, as illustrated in Fig. 8, and in this instance acts also as a resilient cushion upon which the window is adapted to close.

In order to promote the ease with which the window sashes may be raised or lowered, and to further prevent the passage of air thereby, the same are provided with the small weather strips 37, as illustrated in Fig. 3, which are secured to the lower portions of the sashes and travel within the runways of the window casing, these small weather strips being identical with those employed at the sides of the window.

Having thus fully described my invention, what I claim is:—

1. A weather strip comprising an attaching flange, a guide rail plate carried thereby and outstanding therefrom, a sash plate carried at the free end of the guide rail plate and projecting to and beyond the plane of said projecting flange, said sash plate provided at its outer and free extremity with a reinforced selvaged edge, the reinforcement stopping short of the plane of said attaching flange.

2. A weather strip, for a window frame with spaced guide rails and window sashes, comprising an attaching flange secured to the exposed face of a guide rail, a resilient guide rail plate carried by said attaching flange and projecting therefrom and between said window sash and guide rail, a resilient sash plate carried by said guide rail plate bearing against said window sash and projecting beyond the front of said guide rail, the exposed edge of said sash plate being bent toward the guide rail plate and defining a rounded rib, extending along the free edge of said sash plate and stopping short of the plane of the said attaching flange, so as to be adapted to pass thereover.

3. A weather strip comprising an attaching flange adapted to extend across the outer face of a guide rail, a guide rail plate carried by said flange, outstanding therefrom and adapted to project between the guide rail and window sash, a sash plate carried by and connected to the free end of said guide rail plate and adapted to extend between said guide rail and window sash and to project to and beyond the plane of said attaching flange, the connected portion of said guide rail plate and sash plate being located between the said guide rail and window sash and remote from the outer face of said guide rail and attaching flange.

4. A weather strip for a window frame with space guide rails, and a window sash, comprising an attaching flange adapted to engage said guide rail, a resilient guide rail plate carried by said attaching flange and projecting therefrom and adapted to extend between the said window sash and guide rail, a resilient sash plate carried by said guide rail plate, the free extremity of said sash plate adapted to extend beyond the face of said guide rail, and adapted to bear against the external and exposed portion of said window sash and in a position so as to be pressed thereagainst by an external current of air.

Signed at New York, borough of Manhattan, in the county of New York, and State of New York, this 29th day of June, A. D. 1915.

CHARLES R. INGHAM.